UNITED STATES PATENT OFFICE.

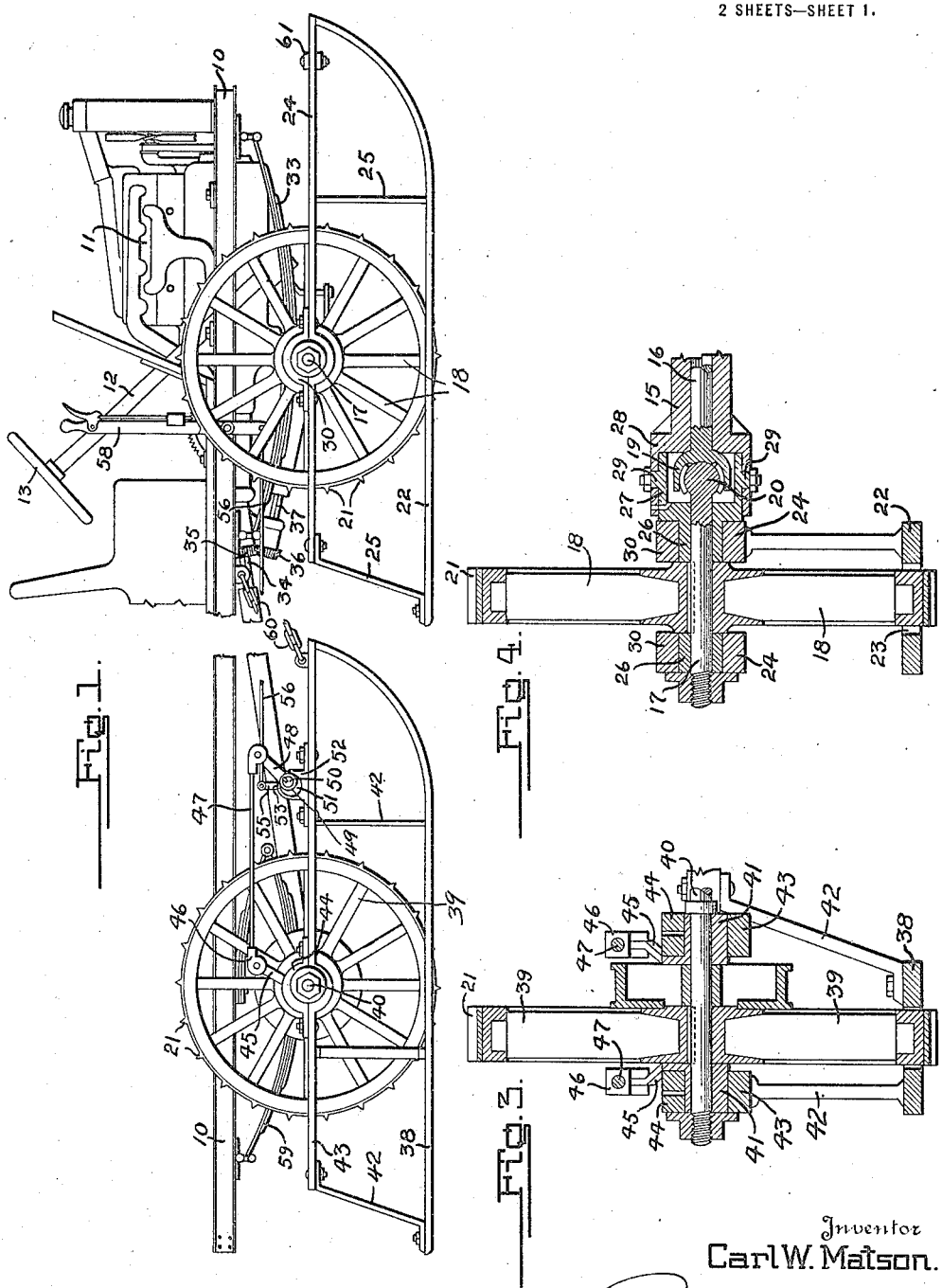

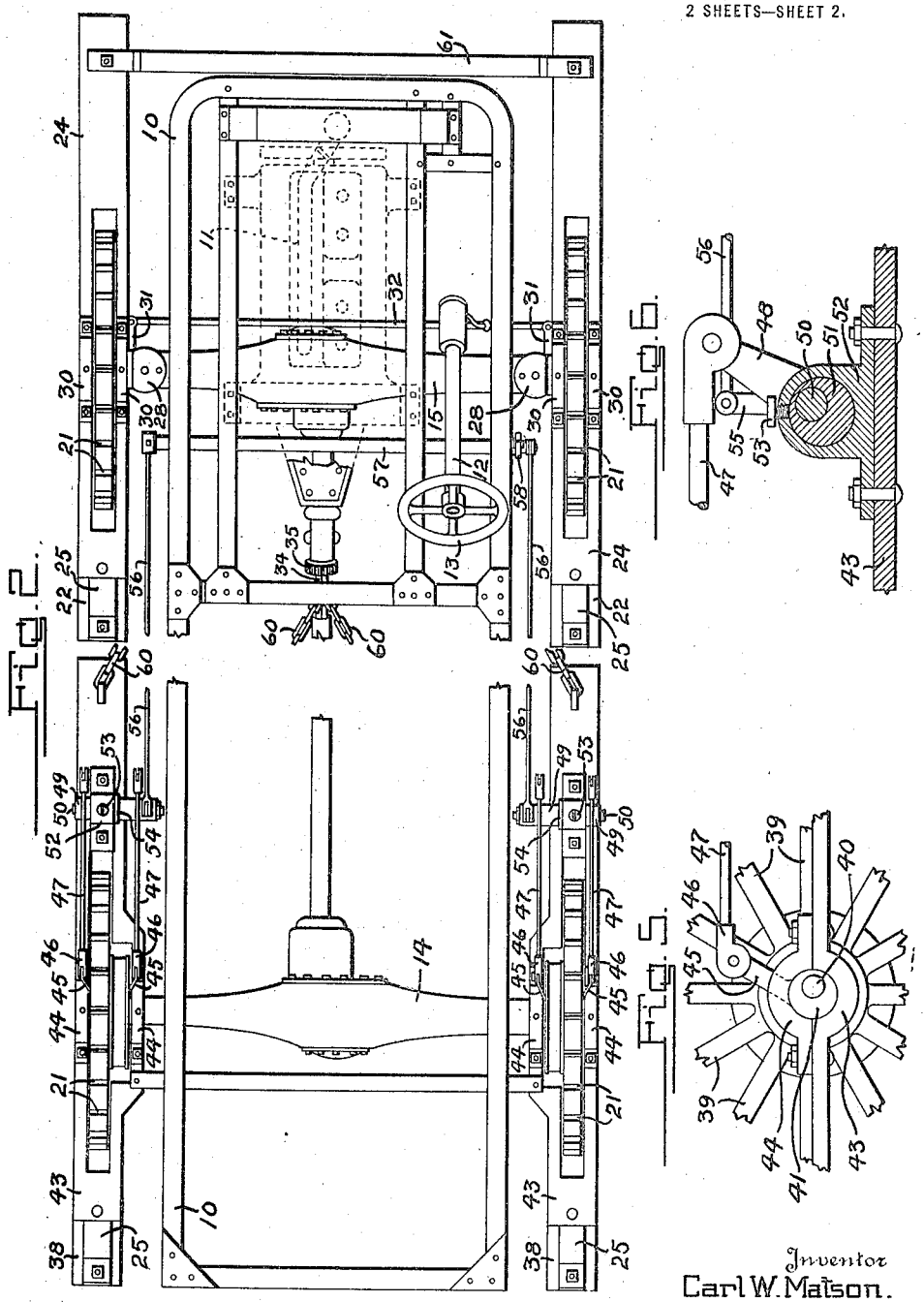

CARLL W. MATSON, OF PRAIRIE CITY, OREGON.

SELF-PROPELLED SLED.

1,302,193.  Specification of Letters Patent.  Patented Apr. 29, 1919.

Application filed March 6, 1918. Serial No. 220,785.

*To all whom it may concern:*

Be it known that I, CARLL W. MATSON, a citizen of the United States, and a resident of Prairie City, in the county of Grant and State of Oregon, have invented certain new and useful Improvements in Self-Propelled Sleds, of which the following is a specification.

The present invention relates to sleds, and more particularly to that type which are adapted to be motor driven.

An object of the present invention is to provide a construction of motor sled wherein the runners or tread members thereof may be arranged in transversely spaced apart relation a distance equal substantially to the usual tread of a motor vehicle; wherein the runners or tread members may be controlled and adjusted for steering the sled in the usual manner of motor vehicles; wherein an improved structure of runner is employed for housing and substantially supporting the traction wheels; wherein all four wheels of the four runners may be motor driven from a unit power plant; wherein the rear traction wheels in the rear runners may be adjusted vertically with respect to the runners for varying the depth of the bite of the wheels in the snow or ice; and wherein is employed a novel construction of adjusting means for the rear traction wheels to take up wear and effect the minute adjustment of the connection.

The invention also contemplates various other important novel features and advantages which will be in part described, and in part understood, from the following detailed description of the present preferred embodiment, the same being illustrated in the accompanying drawings, wherein—

Figure 1 is a side elevation of a motor vehicle frame having the runners and other devices of this invention applied thereto.

Fig. 2 is a top plan view of the view.

Fig. 3 is an enlarged transverse section through one of the rear runners, disclosing the traction wheel mounted therein and the means for adjusting the traction wheel.

Fig. 4 is a similar view through one of the forward or steering runners, showing the mounting of the traction wheel therein.

Fig. 5 is a fragmentary side elevation of the mounting of the traction wheel in one of the rear runners, showing the adjustment for the traction wheel.

Fig. 6 is a transverse section through the adjustable connection between the rods for raising and lowering the rear traction wheel.

Referring to these drawings, 10 designates a motor vehicle frame of any approved construction and which is provided in its forward end with a motor 11, a steering column 12, and a steering wheel 13 on the upper end of the steering column. The frame 10 is supported at its rear and forward ends with transverse axle housings 14 and 15 within which are mounted the usual differential gear mechanism and the laterally extending shaft sections upon which the traction wheels are adapted to be mounted.

As shown in Fig. 4, the front axle housing 15 is provided at its end with a shaft section 16 connected by a universal joint to the spindle 17 upon which the forward traction wheel 18 is mounted. The joint between the shaft 16 and the spindle 17 may be of any approved form, and is shown in the present instance as comprising a socket member 19 carried upon the shaft 16 and receiving therein a ball 20 which is mounted upon the inner end of the spindle 17. Interlocking teeth or the like are provided upon the socket and the ball for causing the same to turn as a unit, and to admit the change in the axial relation of the shaft 16 and the spindle 17. The traction wheel 18 is keyed or otherwise suitably fixed upon the spindle 17, and is provided upon its tread with a plurality of transversely extending teeth 21 adapted to bite in the snow and ice.

The spindle 17 is also adapted to support a forward runner, the same comprising a shoe 22 of metal or the like having intermediate its ends a longitudinal slot 23 through which the traction wheel 18 is adapted to project. The shoe 22 is connected to an upper longitudinal bar 24 by vertical braces 25 at suitable points throughout the length of the runner. The upper bar 24 is also provided with a longitudinal slot which registers vertically with the slot 23 in the shoe and through which the wheel 18 projects. The bar 24 is arched downwardly intermediate its end, and intermediate the slot formed therein to provide the lower portion of a boxing at each side of the slot and in which are mounted a pair of spaced apart bushings 26 and 26′ forming bearings for the spindle 17 at opposite sides of the wheel 18. The inner bushing 26 is provided with a housing section 27 adapted to surround and inclose the universal joint of the driving shaft, and which slidably receives thereover the outer housing section 28 which is carried upon the axle housing 15.

The housing sections 27 and 28 are connected together, pivotally, by trunnions 29 which are arranged in vertical axially alinement with each other and with the universal joint. Straps 30 are secured to the upper face of the bar 24 and are arched upwardly about the bushing 26' to hold the latter to the bar 24 and form the upper section of the boxing for supporting the bearings of the front traction wheel 18. A runner 22, and the adjacent parts thereof just described is arranged upon each end of the front axle housing 18 for supporting the forward end of the sled. Steering arms 31 project forwardly from the housing section 27 and are connected together by a steering rod 32 which extends across the underside of the frame 10 and which has connection with the steering column 12 for simultaneously turning the forward runners and the traction wheels mounted therein into various angles for steering the sled.

The front axle housing 15 is connected to the frame 10 by springs 33 of any suitable type adapted to absorb shock incident to the vibration of the front runners.

Connected to the motor 11 in any well known manner is a drive shaft 34 provided near its forward end with a beveled pinion 35 with which meshes a second beveled pinion 36 mounted upon the rear end of a drive shaft 37, the latter extending to the differential mechanism within the front axle housing 15. The drive shaft section 37 is suitably supported upon the frame 10 and constitutes one means by which the front traction wheels 18 may be driven.

As shown in detail in Fig. 3, each rear runner comprises a shoe 38 having a longitudinal slot 39 formed therein intermediate its ends, and through which projects a rear traction wheel 39. The traction wheel 39 is keyed or otherwise suitably fixed upon the outer end of a drive shaft 40 which projects from the rear axle housing 14, and which is mounted in eccentric bearing openings formed in the eccentric bearing blocks 41 arranged at opposite sides of the wheel 39. The shoe 38 is connected by vertical braces 42 to an upper longitudinal bar 43, the latter being slotted to receive the wheel 39 therethrough, and being arched downwardly intermediate the ends of the slots to receive the eccentric bearing blocks 41 therein. Straps 44 are secured to the upper bar 43 and are arched upwardly above the eccentric bearing blocks 41 to hold the same to the bar 43. A brake drum 45 is secured to the inner side of the traction wheel 39 and is arranged between the latter and the inner bearing block 41. The straps 44 may be provded with downwardly extending openings or passages into which a lubricant may be introduced for passage to the bearing blocks 41.

The eccentric bearing blocks 41 are provided, with preferably integral, upstanding arms 45 arranged at opposite sides of the wheel 39, and to the upper ends of which are pivoted forks 46 constituting couplings also adapted for securement to the rear ends of connecting rods 47 which extend longitudinally at opposite sides of the wheel 39 and terminate near the forward end of the adjacent rear runner. The forward ends of the rods 47 are pivotally connected to arms 48 which rise from sleeves 49 which are keyed or otherwise suitably fixed upon a rock shaft 50. The rock shaft 50 extends through an eccentrically formed opening in a cylindrical bearing block 51 which is rotatably mounted in a bearing bracket 52 secured near the forward end of the bar 43 of the rear runner. The sleeves 49 are secured to the shaft 50 at opposite sides of the bearing block 52 and in line with the upstanding arm 45 of the eccentric bearing blocks 41. A set screw 53, or other suitable device is carried upon the bearing block 52 and adapted to engage the eccentric bearing 51 for holding the latter in adjusted position, the adjustment being effected by engagement with an enlarged collar or flange 54 formed upon one end of the block 51 exteriorly of the bearing bracket 52. The rock shaft 50 has also secured thereto, by means of a collar or the like, an upstanding arm 55 to which is hinged the rear end of a second connecting rod 56 which extends forwardly of the frame 10 and has connection to one end of a transverse rock shaft 57, by means of a rocker arm, used for moving the connecting rod 56 longitudinally. Each rear runner is provided with this mechanism, and a rod 56 is arranged at each side of the frame 10 and connected to each end of the rock shaft 57. A hand lever 58, or other suitable mechanism is arranged upon the forward end of the frame 10 adjacent to the operator's seat to facilitate the adjustment of the connecting rods 56 and 47 and consequently the raising and lowering of the rear traction wheels in their respective runners. The rear traction wheels, are provided with the teeth 21 similar to those formed upon the forward traction wheels 18.

The drive shaft 35 of the motor is connected in the usual manner to the rear axle housing 14 for driving the shaft section 40 therein, and the axle housing 14 is connected to the rear end of the frame 10 by springs 59 or the like for absorbing shock incident to the vibration of the rear runners. Anchoring chains 60 are preferably connected to the forward ends of the rear runner and to an intermediate portion of the main frame 10 for holding the runners from undue lateral vibration. A tie bar 61 is preferably connected to the forward ends of the front runners for holding the latter in spaced apart relation and substantially parallel at all times. The tie bar 61 is pivotally connected at opposite ends to the forward runners to admit swinging of the latter to steer the sled.

The above is a specific disclosure of but one embodiment of this invention, and the same may be changed and modified to adapt the device of this invention to various conditions met with in both installation and manufacture, the changes and modifications being only by the scope of the following claims.

I claim:

1. In a motor sled, the combination with a runner, of a shaft, an eccentric bearing block mounted on the runner for the shaft, a traction wheel mounted on the shaft, means for turning said bearing block to raise and lower the shaft and project the traction wheel at various distances below the runner, and driving means connected to the shaft.

2. In a motor sled, the combination of a runner provided with a longitudinal slot therein and bearings at opposite sides of the slot, eccentric bearing blocks arranged in the bearings, a shaft journaled in said bearing blocks, a traction wheel arranged in the slot and mounted on said shaft between the bearings, means for driving said shaft to turn the traction wheel, and a manually controlled connection to said eccentric bearing blocks adapted to turn the same and raise and lower the shaft and the traction wheel.

3. In a motor sled, the combination of a runner provided with a longitudinal slot therein, a traction wheel arranged in the slot, a shaft for the traction wheel, eccentric bearing blocks carried upon the runner for supporting said shaft, arms extending upwardly from the bearing blocks, rods pivoted to the upper ends of said arms, a rock shaft arranged transversely upon the forward end of the runners, arms fixed to the rock shaft having pivotal connection with said rods, an operating arm connected to the rock shaft for turning the same to actuate the rods, and an eccentric bearing on the runner for said rock shaft.

4. In a motor sled, the combination of a body, a rear runner, a traction wheel mounted in the runner, a vertically adjustable bearing for the traction wheel to project the latter to various extents below the runner, a rod connected to the bearing, a rock shaft having two arms one of which is pivoted to said rod, an operating handle on the sled body, a second rod connecting the other arm to said lever, and an eccentrically adjustable bearing for the rock shaft to permit the regulation of the amplitude of movement of the rock shaft carried arms.

5. In a motor sled, the combination of a body, a pair of rear runners for supporting the body, traction wheels mounted in the runners, vertically adjustable bearings on the runners for said traction wheels to project the latter to various extents below the runners, rods connected to the bearings, a rock shaft for each runner having two arms one of which is pivoted to the adjacent rod, an operating handle on the sled body and rods arranged between the other arms of said rock shaft and said lever, whereby the elevation of said wheels may be simultaneously adjusted different degrees.

6. In a runner for motor sleds, the combination of a shoe, an upper bar supporting the shoe, a traction wheel, a vertically adjustable bearing carried upon said bar to support the traction wheel and adapted to be moved for projecting the traction wheel to various extents below said shoe, a rock shaft on said upper bar, a rod connecting said bearing to said rock shaft, operating means connected to the rock shaft for turning the same to adjust said bearing, an eccentric mounting on said upper bar for said rock shaft and means for holding said eccentric mounting in adjusted positions to permit variation of the amplitude of movement of said rod.

7. In a motor sled, the combination of a body, a pair of rear runners for supporting the body, traction wheels mounted in the runners, vertically adjustable bearings for the traction wheels to project the latter to various extents below the runners, rods connected to said bearings for adjusting the same, a hand lever mounted on the sled body, a rock shaft mounted on each runner and having arms connected to said hand lever and having other arms connected to said rods, and independently adjustable eccentric bearings on the runners for said rock shaft to independently control the throw of the same and effect the desired simultaneous operation of the traction wheels.

8. In a motor sled, the combination with a pair of runners, of bearings carried by said runners, eccentric bearing blocks in said bearings, an axle journaled in said eccentric bearing blocks, traction wheels carried by said axle, and eccentric bearings supported by each of said runners near their forward ends, stub rock shafts carried by said eccentric bearings, arms connecting each rock shaft to the adjacent eccentric bearing blocks which carries said axle to raise or lower the axle and traction wheels on rotation of the eccentric bearing blocks, bearings supporting said eccentric bearings, and set screws carried by said last named bearings for binding engagement with the eccentric bearings carried thereby to hold the latter in adjusted positions to regulate the amplitude of movement of said eccentric bearing blocks by the rotation of said rock shafts, and to permit variation of the throw of the eccentric bearing blocks carried by each runner with respect to the eccentric bearing blocks carried by the other runner.

CARLL W. MATSON.

Copies of this patent may be obtained for five cents each, by addressing the "Commissioner of Patents, Washington, D. C."